United States Patent
Favero et al.

(10) Patent No.: US 9,469,805 B2
(45) Date of Patent: Oct. 18, 2016

(54) FORMULATIONS OF WATER-SOLUBLE POLYMERS AND STABILIZING ADDITIVES FOR INJECTING A SINGLE COMPOUND USEABLE IN INJECTION FLUIDS FOR CHEMICAL ENHANCED OIL RECOVERY

(75) Inventors: Cédrick Favero, Saint Romain le Puy (FR); Nicolas Gaillard, Saint Etienne (FR); Bruno Giovannetti, Saint Etienne (FR)

(73) Assignee: S.P.C.M. SA, Andrezieux Boutheon (FR)

( * ) Notice: Subject to any disclaimer, the term of this patent is extended or adjusted under 35 U.S.C. 154(b) by 0 days.

(21) Appl. No.: 13/319,193

(22) PCT Filed: Jun. 12, 2009

(86) PCT No.: PCT/EP2009/057270
§ 371 (c)(1),
(2), (4) Date: Nov. 7, 2011

(87) PCT Pub. No.: WO2010/133258
PCT Pub. Date: Nov. 25, 2010

(65) Prior Publication Data
US 2012/0058922 A1    Mar. 8, 2012

(30) Foreign Application Priority Data
May 18, 2009 (FR) .................... 09 53258

(51) Int. Cl.
C09K 8/588 (2006.01)
C08K 5/00 (2006.01)
C08F 220/56 (2006.01)

(52) U.S. Cl.
CPC ............. *C09K 8/588* (2013.01); *C08K 5/005* (2013.01); *C08F 220/56* (2013.01)

(58) Field of Classification Search
None
See application file for complete search history.

(56) References Cited

U.S. PATENT DOCUMENTS

| | | |
|---|---|---|
| 3,234,163 A | 2/1966 | Schurz et al. |
| 3,235,523 A | 2/1966 | Schurz et al. |
| 3,284,393 A | 11/1966 | Vanderhoff et al. |
| 3,343,601 A | 9/1967 | Pye et al. |
| 3,624,019 A | 11/1971 | Anderson et al. |
| 4,141,842 A | 2/1979 | Abdo |
| 4,317,759 A | 3/1982 | Kanda et al. |
| 4,481,316 A | 11/1984 | Kanda et al. |
| 4,622,356 A | 11/1986 | Jarovitzky et al. |
| 4,795,575 A * | 1/1989 | Southwick et al. ......... 507/225 |
| 4,874,588 A | 10/1989 | Sortwell et al. |
| 4,925,578 A * | 5/1990 | Southwick et al. ......... 507/225 |
| 5,222,807 A | 6/1993 | Gaddis |
| 5,296,577 A * | 3/1994 | Tamura et al. ............. 526/220 |
| 2006/0116296 A1* | 6/2006 | Kippie et al. ............... 507/244 |
| 2008/0318812 A1* | 12/2008 | Kakadjian et al. ......... 507/221 |

FOREIGN PATENT DOCUMENTS

| | | |
|---|---|---|
| EP | 0 100 963 A2 | 2/1984 |
| EP | 1 437 173 A1 | 7/2004 |
| FR | 2604444 A1 | 4/1988 |
| JP | 57-159839 A | 10/1982 |

OTHER PUBLICATIONS

International Search Report for PCT/EP2009/057270, mailed Nov. 5, 2009.
Search Report from the French Institute of Intellectual Property for FR 0955555, Mar. 16, 2010.
Bayer et al., Don't be baffled by Static Mixers. Chemical Engineering. May 2003:50-7. Available at http://www.highbeam.com/doc/1G1-102272308.html/print. Last accessed Nov. 22, 2011. 4 pages.
Kraume et al., Continuous mixing of fluids. Ullmann's Encyclopedia of Industrial Chemistry. 2012;10:105-34.
Thomas, Enhanced Oil Recovery—An Overview. Oil & Gas Science and Technology—Rev IFP. 2008;63(1):9-19.

* cited by examiner

*Primary Examiner* — Jeffrey Washville
(74) *Attorney, Agent, or Firm* — Heslin Rothenberg Farley & Mesiti P.C.

(57) ABSTRACT

Composition based on anionic polymers or water-soluble amphoteric (co)polymers suitable for viscosifying the injection fluids for oil recovery, characterized in that, before dilution with the injection fluid, it further contains at least 3 stabilizing agents selected from the group comprising oxygen reducing agents, precipitating agents, free radical scavengers, complexing agents and sacrificial agents, the said stabilizing agent being suitable for preventing the chemical degradation of the polymer once the polymer is introduced into the injection fluid.

17 Claims, 2 Drawing Sheets

FORMULATIONS OF WATER-SOLUBLE POLYMERS AND STABILIZING ADDITIVES FOR INJECTING A SINGLE COMPOUND USEABLE IN INJECTION FLUIDS FOR CHEMICAL ENHANCED OIL RECOVERY

PRIORITY INFORMATION

The present application is a national stage filing under 35 U.S.C. §371 of international PCT application, PCT/EP2009/057270, filed Jun. 12, 2009, which claims priority to French application, number 0953258, filed May 18, 2009, each of which is incorporated herein by reference.

The present invention relates to a novel formulation based on water-soluble polymers for the preparation of viscous solutions stable, in fluid injection applications and in particular for enhanced oil recovery.

More precisely, the invention relates to polymers mainly in powder or emulsion form, containing a combination of additives selected for their physicochemical properties and their capacity to limit the degradation of polymer solutions prepared from this formulation. In the context of the present invention, degradation means the modification of the viscosity of the polymer solution, during its propagation in the reservoir in connection with its use as an injection fluid and in particular for enhanced oil recovery.

This novel formulation advantageously serves to improve the stability of the injected polymer. It also serves to significantly reduce the requirements pertaining to logistics, hygiene and safety, investment and storage and injection equipment.

Most oil fields production have become mature and have accordingly seen a decline of their production or are on the point of doing so. The recovery rate of these fields is currently about 15 to 35% on average of the oil in place. Hence they still offer considerable production potential.

The crude oil contained in the reservoirs is generally recovered in several steps.

Production first results from the natural energy of the fluids and the rock decompression. Following this depletion phase, the quantity of oil recovered at the surface represents on average some 5 to 15% of the initial reserve. It is therefore necessary, in a second step, to employ techniques designed to boost the recovery yield while maintaining the pressure of the field.

The most frequently used method consists in injecting water into the reservoir through dedicated injection wells. This is commonly referred to as secondary recovery. This second phase stops when the water content in the mixture produced by the producing wells is to high. In terms of additional recovery rate, the gain here is about 10-20%.

The other useable techniques are combined under the name of enhanced oil recovery (EOR). Their aim is to recover between 10 and 35% of additional oil. The term enhanced oil recovery includes thermal techniques, non-thermal techniques such as electrical, miscible, steam or even chemical techniques for enhanced recovery of the oil remaining in place (cf. *Oil & gas science and technology—revue IFP*, vol 63 (2008) No. 1, pp 9-19). In the context of the present invention, oil means any type of oil, that is light oil, heavy oil, or even bituminous oil.

The invention relates more precisely to chemical enhanced oil recovery, involving at least the injection of water-soluble polymers in the form of a dilute solution.

The injection of a viscous polymer solution by the technique employed is carried out alone or in combination with other chemical compounds useful for enhanced oil recovery.

Among these other chemical compounds, mention can be made of the use of a weak, strong or extra-strong, inorganic or organic base capable of saponifying the crude oils and fabricating surfactant species in-situ for solubilizing the oil. By way of example, these include sodium carbonate, caustic soda, borate and metaborate compounds, amines, basic polymeric species. Another family of compounds commonly injected with polymers is that of surfactant compounds. The surfactant can be a anionic, zwitterionic, cationic and sometimes also non-ionic polar head. These compounds can be injected pure or along with a co-surfactant and/or a co-solvent to improve their compatibility and effectiveness in the reservoir, In all these techniques, the efficiency of the chemical treatment is improved by the addition of water-soluble polymers over simply water injection. The benefits anticipated and proved by the use of polymers—through the "thickening" of the injected water—are improved sweep and control of the mobility in the field, in order to recover the oil more rapidly and efficiently. These polymers increase the viscosity of the water.

A person skilled in the art knows that synthetic water-soluble polymers and in particular acrylamide based polymers are highly advantageous for increasing the viscosity of aqueous solutions and are therefore widely used in enhanced oil recovery.

The main polyacrylamides used are anionic in nature and derived from:
- copolymerization of acrylamide and acrylic acid,
- co-hydrolysis or post-hydrolysis of a polyacrylamide
- copolymerization or terpolymerization of acrylamide with other ionic or non-ionic functional monomers.

They have already been widely used in enhanced oil recovery in techniques called "polymer", "surfactant polymer", "alkaline surfactant polymer" (P, SP, ASP) techniques.

However, when high (molecular weight (MW>1 million) or even very high molecular weight (MW>18 million) polymers are used, the excellent results in enhanced recovery of the oil in place observed in the laboratory on cores (demonstrating the improved microscopic displacement of the oil) have only been partially confirmed in the field.

In fact, core tests use defined polymers which are not degraded, whereas the polymer in the field undergoes considerable changes which are not normally reproduced in the laboratory. Since 1995, SNF has analyzed these modifications on several samples of water produced in enhanced oil recovery projects. The results obtained show that the degradation of the polymer in the field may sometimes be extremely high, thereby confirming that core tests only allow a partial study essentially showing the infectivity and adsorption of the polymer tested.

This means that, particularly when the injection conditions are not optimal in a field, the following may be observed in comparison with the laboratory tests:
- a drop in viscosity of the injection fluid by a factor of up to 5 to 20,
- a concomitant reduction of the molecular weight of the polymer by a factor of 3 to 20,
- a drop in concentration by precipitation, adsorption or dilution by a factor of 2 to 5.

In the oil fields, where the polymer is injected without controlling the content of oxygen, dissolved metals, hydrogen sulphide and other species interacting with the polymer chain, very severe degradation is observed, through three main degradation modes:

biological,
mechanical,
chemical.

Biological degradation is largely limited by continuous injection or alternate slugs of chemicals with a strong biocidal action (bactericides, ammonium nitrate).

Mechanical degradation is limited by the selection and use of specific equipment and careful control over the speeds and pressure drops in the various infection equipment.

Chemical degradation of the polymers corresponds to the mechanism that is most difficult to predict and quantify because it takes place during injection and in the reservoir by several mechanisms. This degradation so tar does not have a practical universal solution.

This degradation is first due to the formation of free radicals which react with the main polymer chain and cause a drop in the molecular weight. This results in a viscosity drop of the solution, with the associated decrease in hydrodynamic volume. The free radicals may come from various sources: they may be generated by the cleavage of weak bonds of the polymer chain under the effect of heating/friction or by initiator residues or impurities of by-products. Redox systems also generate free radicals. The presence of oxygen is the most detrimental factor for degradation of the polymer. The degradation reaction of the polymers by oxygen is catalized by the presence of metal such as iron or by the presence of hydrogen sulphide.

Furthermore, conventional polymers show some sensitivity to thermal degradation. Above 60° C., the acrylamide groups can be hydrolyzed to acrylate groups, thereby increasing the anionic charge of the macromolecule and making it more sensitive to divalent salts. Above a degree of anionicity of about 35-40%, the macromolecule can precipitate in the presence of calcium or magnesium ions. The sensitivity of the polymers can be reduced by adjusting the monomers employed. However, for a given chemistry, the polymer containing acrylamide entities always tends to hydrolyze and therefore always displays greater sensitivity to the presence of divalent ions.

The combined or separate effect of thermal and radical degradations sometimes prevents the use of a polymer, because by precipitating, the polymer can reduce the permeability of the formation, or its injection becomes uneconomical because require to overdose the polymer in order to anticipate this viscosity degradation.

During its injection and propagation in the porous medium, the polymer is therefore subjected to chemical degradation. To overcome this problem, many solutions have been described to stabilize the polymers and thereby prevent it from chemical degradation. The main one consists in adding stabilizing agents. These chemicals are well described in literature and conventionally selected according to the conditions encountered in the field, as presented in the table below.

| Polymer use conditions | | Stabilizer | Role of stabilizer |
|---|---|---|---|
| Minimize of free radical degradation of the polymer | Minimize the sources causing or accelerating the formation of free radicals | Oxygen reducing agent | Remove residual oxygen |
| | | Precipitating agent | Complex and precipitat metal ions to decrease their activity |
| | Scavenge free radicals before they | Free radical scavenger | Forms more stable free radicals without a |

| Polymer use conditions | | Stabilizer | Role of stabilizer |
|---|---|---|---|
| | attack the polymer | | degrading effect on the polymer chain |
| | | Sacrificial agent | Reacts very rapidly with the free radicals formed to absorb them |
| Minimize thermal degradation of the polymer | Complex the ions interacting with the anionic groups of the polymer to reduce its viscosity or even to precipitate it | Complexing agent | Complex metal ions with valency higher than or equal to two in the broad sense of the term (transition, alkali, alkaline earth metals) |

Among the stabilizing agents most commonly described in the literature, mention can be made for example of the following:

As Oxygen Reducing Agents:

The oxygen reducing agents commonly described are compounds such as sulphite, bisulphite, metabisulphite, dithionite, hydrazine and its hydroxylamine derivatives. Their use for polyacrylamides is described in U.S. Pat. No. 3,343,601. They all act as reducing agents modifying the redox potential of the aqueous formulation. This class of chemical compounds can also he considered to include organic sulphites such as alkylated sulphites, alkyl hydrosulphites, sulphinate, sulphoxylate, phosphates, as well as oxalic or formic acid, erythorbate salts, carbohydrazides. They serve to remove the traces of oxygen in the injection water to typically reach dissolved oxygen contents lower than 200 ppb (parts per billion), Preferably, in agreement with the physicochemical, toxicological and industrial criteria, the oxygen scavenging compounds of the organic and inorganic sulphite type are particularly advantageous. Mention can be made for example of Na2SO3 (sodium sulphite) and NaDT (sodium dithionite).

As Precipitating Agents:

The precipitating agents commonly described reacting with the metals used in redox reactions are generally anionic compounds. In fact, their action mechanism is the formation of a complex having low solubility with cationic charged metals in solution. These are hydroxides, carboxylates, carbonates, arsenates, cyanurates, phosphorus derivatives and even sulphur derivatives. In the case of iron, a metal often present in the production water used for the preparation of the polymer solutions, mention can be made for the compounds of the family of phosphorus salts, sodium phosphate, sodium hydrogenophosphate, phytic acid, or of sulphur salts, sodium sulfide, sodium sulfydrate or, for the family of carbonates, sodium carbonate. In addition to their efficiencies, sodium carbonate and sodium phosphate are preferably employed for their low cost, availability, low toxicity and good physicochemical properties.

As Free Radical Scavenger:

Free radical scavenger are usually sulphur compounds, sterically hindered amines, aromatic compounds, nitroxides. These compounds have the tendency to react with the free radicals to form a stable species in which the free radical is trapped. The radical is then no longer available to degrade the polymer. Many free radical scavengers are described for stabilizing polymers. Mention can be made of chemicals like thiourea, 2-mercaptobenzothiazole, dimedone, N,N'-dimethylthiourea, N,N'-diethylthiourea, N,N'-diphenylthio urea, ammonium thiocyanate, tetramethylthiuram disulphide, 2,2'-dithiobis(benzothiazole), sodium dimethyldithiocarbarnate, paramethoxyphenol propyl, 3,4,5-trihydroxybenzoate, 2,6-di-tert-butyl-4-methylphenol, 2,5-di(tert-amyl) hydroquinone, 4,4'-thiobis(6-tert-butyl-m-cresol), ammonium N-nitrosophenylhydroxylamine, butylhydroxyanisole, hydroxy-8-quinoleine, 4-hydroxy-2,2,6,6-tetramethyl-piperidinooxy, 5-hydroxy-1,4-naphtoquinone, (N-(1,3-dimethylbutyl)N'phenyl-p-phenylenediamine, 2,6-di-tert- butyl-4-methylphenol, 2,5-Di (tert-amyl) hydroquinone, 4,4'-thiobis (6-tert-butyl-m-cresol), dicyandiamide, guanidine, cyanamide, etc.

This list cannot be considered exhaustive due to the number of possible variations in these often complex chemistries. Preferably, the invention is concentrated on thioureas and alkyl thioureas, mercaptobenzoimidazole (MBI) or mercaptobenzothiazole (MBT) and combinations thereof as used by Shell, Diafloc and Nitto (U.S. Pat. Nos. 4,317,759, 4,925,578, 4,481,316, 4,795,575, 5,296,577), thiourea (U.S. Pat. No. 3,235,523), Butyl hydroxyanisole, paramethoxy phenol, quinolinol as mentioned in JP57-159839 to Mitsubishi Chemicals, 5,5-dimethyl-1,3-cyclohexane dione of U.S. Pat. No. 4,622,356 to American Cyanamid, sodium thiocyanate of U.S. Pat. No. 3,234,163 to Dow.

In addition to performance, the consideration of the physicochemical, toxicological and economic criteria makes it advantageous to use compounds such as diethyl thiourea, dimethyl thiourea, mercaptobenzothiazole and mercapto benzoimidazole, without this being limiting.

As Sacrificial Agents:

Sacrificial agents are usually of the family of alcohols (U.S. Pat. No. 4,141,842, JP57159839), The use of a monomer has also been described (FR 2604444). Through its hydroxyl function, the alcohol is oxidized in its ketone form and thereby consumes the free radical, whereas the monomer, due to its double bond, consumes the free radical by free radical polymerization, The list of useable alcohols and monomers is virtually infinite, Most monomers constituting water-soluble polymers are suitable and mention can be made as a preferred monomer, without being limiting, of diallyl dimethyl ammonium chloride, acrylamide, methacrylamide.

The alcohols may be monoalcohols or polyols and one criterion for selection is the number of hydroxyl functions per unit of mass and solubility in water. Preferably, and without constituting a limitation, the list includes glycerol, propylene glycol, trimethyleneglycol, isopropanol, 1,2-butanediol, 1,3-butanediol, 1,4-butanediol, 2,3-butanediol, 1,2, 4-butanetriol, pentaerythritol (FETA), trirnethylolethane, neopentylglycol, 1, -pentanedial, 2,4-pentanediol, 2,3-pentanediol, trimethylolpropane, 1,5-pentanediol, polyvinyl alcohol partially or totally hydrolyzed.

As Complexing Agents:

The complexing agents commonly described reacting with the metals present in the brines are generally anionic compounds. In fact, their action mechanism is the formation of a complex having a high solubility and strong affinity for cationic charged metals in solution. They are carboxylsite derivatives, phosphorus derivatives, amino acids, sulphonates, etc. These agents may be in the form of single molecules or polymers.

Mention can be made of the following for polymers: polyacrylates issuing from the polymerization of acrylic acid, copolymers with sulphonated groups (issuing from ATBS, vinyl sulphonic, allyl sulphonic, methallyl sulphonic acid, etc) or maleates (issuing from maleic anhydride), and terpolymers including a non-ionic monomer such as acrylamide, styrene, hydroxypropyl acrylate, etc. Mention can be made of polyacetates, and polycarboxylates, polyaspartates, polyphosphates and polyphosphonates, polysuccinates.

For shorter molecules, mention can be made of ascorbic acid (tetrasodium, iminodisuccinate) citric acid, dicarboxymethylglutamic acid, ethylenediaminedisuccinic acid (EDDS), ethylene-diamine-tetraacetic acid (EDTA), Hepta sodium salt of diethylene triamine penta (methylene phosphonic acid) (DTPMP•Na7), maleic acid, nitilotriacetic acid (NTA), oxalic acid, polar amino acids, including arginine, asparagine, aspartic acid, glutamic, glutamine, lysine, and ornithine, succinic acid, diethylenetriaminepentaacetic acid, disodium malonic acid, disodium tartric acid, sodium tripolyphosphate, sodium hexanadaphosphate, sodium silicate, iminodiacetic acid, 1,2-diaminopropane N-tetraacetique acid, 1,2-cyclobexanediaminetetraacetic acid, N-(2-hydroxyethyl) ethylene diamine triacetic acid, diethylenetriaminepentaacetic acid, diethyl iminodiacetate acid, etc.

It is nevertheless important to note that:
  these additives are used by separate addition and directly in the injection water, requiring management of supplies, transport logistics, equipment, a storage area, means for implementing their injection on top of the polymer,
  and that the use of a single compound is generally insufficient to stabilize the polymers satisfactorily.

Thus, despite all the solutions considered, none of them provides a really effective and optimal stabilization of the polymer.

The present invention solves all these problems associated with the use of additives for stabilizing polymers subject to Chemical degradation. Its object is the combination of at least three stabilizing agents in one and the same formulation containing the polymer and before its dilution to end use concentration.

In other words, the invention relates to a composition based on anionic polymers or water-soluble amphoteric (co)polymers suitable for viscosifying the injection fluids for oil recovery, characterized in that, before dilution with the injection fluid, it further contains at least 3 stabilizing agents selected from the group comprising oxygen reducing agents, precipitating agents, free radical scavengers, complexing agents and sacrificial agents, the said stabilizing agents being suitable for preventing the chemical degradation of the polymer once the polymer is introduced into the injection fluid.

It has surprisingly been found that this combination permits a combined action with greater effectiveness than that obtained when the addition is carried out in several steps and thereby serves to improve the protection of the polymer during its use, particularly in the "oil field" application during the steps of injection and propagation in the porous media.

Without trying to tie the invention to any particular theory, it appears that the combination of all the stabilizers necessary and the polymer in a single compound before its dissolution has an unexpected synergistic effect, which effectively serves to limit the chemical degradation thereof.

It is also to note that the use of a single compound containing all the additives required privide a significant savings in terms of logistics, storage, injection and footprint of injection facility. This has the added advantage of reducing the problems of hygiene and safety associated with the handling of the pure products, and therefore constitutes an efficient, practical and economical solution particulary beneficial to offshore operations.

According to the invention, the polymers used include all types of ionic organic polymers soluble in water, including amphoteric (co) polymers.

Practically, the polymer used contains:
a) at least one monomer selected from non-ionic monomers based on acrylamide, acrylic, vinyl, allyl maleic backbone and having a polar non-ionic side group: acrylamide, methacrylamide, N-vinyl pyrrolidone, N-vinyl formamide, polyethelene glycol methacrylate, etc.
b) and optionally one or more ionic monomers: mention can be made in particular of anionic monomers based on an acrylamide, acrylic, vinyl, allyl or maleic backbone and having a carboxylic function (e.g.: acrylic acid, methacrylic acid and salts thereof), or having a sulphonic acid function (e.g.; 2-acrylamido-2-methyl-propane sulphonic acid (ATBS) and salts thereof). For the cationic monomers based on an acrylamide, acrylic, vinyl, allyl or maleicbackbone and having an amine or quaternary ammonium function, mention can be made in particular, and without this being limitation, of dimethylaminoethyl acrylate (ADAME) and/or dimethylaminoethyl methacrylate (MADAME), quaternized or salified, dimethyldiallylammonium chloride (DADMAC), acrylamide propyltrimethyl ammonium chloride (APTAC) and/or methacrylamido propyltrimethyl ammonium chloride (MAPTAC), optionally combined with c) a hydrophobic monomer based on an acrylamide, acrylic, vinyl, allyl or maleic backbone, having a side hydrophobic function selected from the group comprising derivatives of acrylamide such as N-alkylacrylamide for example diacetone acrylamide, isopropyl acrylamide, N-tert-butylacrylamide, octylacrylamide and also N,N-dialkylacrylamides such as N,N-dihexylacrylamide, N,N dimethylacrylamide, derivatives of acrylic acids such as alkyl acrylates or methacrylates. Also useable are vinyl monomers such as N-vinylformamide, N-vinyl acetamide, N-vinylpyridine, and N-vinylimidazole.
d) and a branching/crosslinking agent selected from the group comprising methylene b is acrylamide (MBA), ethylene glycol diacrylate, polyethylene glycol dimethacrylate, diacrylamide, cyanomethylacrylate, vinyloxyethylacrylate or methacrylate, triallylamine, formaldehyde, glyoxal, compounds of the glycidylether type such as ethyleneglycol diglycidylether, or epoxy,
e) and a surfactant monomer based on an acrylamide, acrylic, vinyl, allyl or maleic backbone and having a structure bearing both hydrophilic and hydrophobic functions, the hydrophilic &notion possibly being an ionic function (carboxylic, sulphate, quaternary ammonium) or non-ionic function (ethylene oxide moieties with optionally propylene oxides). Mention can be made preferably of acrylamido undecanoic acid, acrylamido methyl undodecyl sulphonic acid, dimethyl dodecyl propyl methacrylamide ammonium chloride, behenyl 25-ethoxylated methacrylate, diallyl methyl dodecyl ammonium chloride.

According to the invention, the water-soluble polymers used do not require the development of a particular polymerization method. They can be obtained by all polymerization techniques well known to a person skilled in the art (solution polymerization, suspension polymerization, gel polymerization, precipitation polymerization, emulsion polymerization (aqueous or reverse) followed or not by a spray drying step, suspension polymerization, micellar polymerization followed or not by a precipitation step).

Due to the selection of monomers, the polymer may have a linear, branched, crosslinked structure or a comb architecture (comb polymer) or a star structure (star polymer).

The polymer preferably has an ionicity lower than 70 mol % and a molecular weight of between 1 million and 30 million. Acrylamide based polymers are preferred (at least 20 mol %) copolymerized with acrylic acid, 2-acrylamido-2-methylpropane sulphonic acid or N-vinyl pyrrolidone.

The stabilizing agents incorporated in the polymer formulation are obtained from the various families of additives described above.

A person skilled in the art will know how to select at least three stabilizing agents originating indifferently from the abovementioned groups, according to his own knowledge, the conditions of use of the polymers, and the compatibility of the stabilizers. Moreover, a person skilled in the art will take into account the standard requirements concerning toxicity (for human as well as the environment) and industrial reality (price, availability).

The stabilizing agents are preferably selected from:
As oxygen reducing agents:
Sulphites in all forms, carbohydrazides and derivatives of hydrazine, sodium erythorbate.
As precipitating agents:
Sodium carbonate and sodium phosphate.
As free radical scavenger agents:
Diethyl thiourea, dimethyl thiourea, mercaptobenzothiazole and mercapto benzoimidazole,
As sacrificial agents:
glycerol, propylene glycol, trimethyleneglycol, isopropanol, 1,2-butanediol, 1,3-butanediol, 1,4-butanediol, 2,3-butanediol, 1,2,4-butanetriol, pentaerythritol (PETA), trimethylolethane, neopentylglycol, 1,2-pentanediol, 2,4-pentanediol, 2,3-pentanediol, trimethylolpropane, 1,5-pentanediol, polyvinyl alcohol partially or totally hydrolyzed.
As Complexing Agents:
polyacetates and polycarboxylates, polyaspartates, polyphosphates and polyphosphonates, polysuccinates, ethylene-diamine-tetraacetic acid (EDTA), Hepta sodium salt of diethylene triamine penta (methylene phosphonic acid) (DTPMP•Na7), maleic acid, nitrilotriacetic acid (NTA), oxalic acid.

In a preferred embodiment, the composition contains at least 3 stabilizing agents including respectively 2 different stabilizing agents selected from the group comprising the free radical scavengers and a third stabilizing agent different from the first two and selected indifferently from the group comprising the free radical scavenger, complexing agents, sacrificial agents, oxygen reducing agents or precipitating agents.

In a second preferred embodiment, the composition contains at least 3 stabilizing agents respectively a first stabilizing agent selected from the group comprising free radical scavenger, a second stabilizing agent selected from the group comprising oxygen reducing agents and a third stabilizing agent different from the first two and selected indifferently from the group comprising free radical scavenger, complexing agents, sacrificial agents, oxygen reducing agents or precipitating agents.

The invention also relates to a method for offshore or onshore enhanced oil recovery, consisting in injecting a fluid into the reservoir, the fluid being previously thickened by means of a water-soluble polymer, characterized in that the polymer is in the form of the composition as described above.

Advantageously, the formulation contains at least 30% by weight of polymer, preferably at least 50% by weight of polymer. To thicken the injection water, water-soluble polymer concentrations of 10 g/l are sometimes necessary for highly saline brines, suitable for high temperatures, for low molecular weight water-soluble polymers and for the most viscous crude oils. Thus, the formulation is injected at concentrations allowing up to 10 g/l of polymer to be injected, leading to a maximum concentration of 33 g/l.

Preferably, the polymer is injected at Less than 5 and represents at least 50% of the formulation, an advantageous implementation for the invention is thus the injection of the formulation at a concentration lower than 10 g/l.

The invention relates to the use of a stabilized water-soluble polymer composition as previously defined, particularly in the field of enhanced oil recovery or FOR.

The scope of the invention is not limited to the use for EOR but also to other areas in which the polymer is liable to encounter similar degradation conditions (presence of oxygen, metals, free radicals) such as drilling, mining, treatment of tailings, etc.

The invention and its advantages will appear more clearly from the examples that follow, in conjunction with the appended figures, but without them limiting its scope.

EXAMPLES

All the values of the additives are given in weight per cent with regard to the polymer.

Experimental Protocol for the Use of Powders in Solution

The powders are dissolved under stiffing in the brine to obtain a stock solution containing 5000 ppm of polymer, The stock solution is then diluted under stirring to the desired polymer concentration. Nitrogen degassing is applied to obtain the targeted residual quantity of oxygen (in parts per billion: ppb).

For comparison, a polymer powder not containing the additives is dissolved in the same way as previously described. The additives are then added during the dilution step under a nitrogen blanketstream. Solid chemicals are first dissolved in water exempt of oxygen using a nitrogen purge.

If necessary, iron H is added in the form of Mohr's salt as follows: the Mohr salt is added under nitrogen blanket in the dilution water previously degassed with nitrogen, Part of the concentrated solution is then added at the end of the step of dilution of the polymer stock solution in order to obtain the target iron II concentration. The solutions are then distributed in various glass ampoules which are sealed under nitrogen blanket. Each ampoule is placed in an oven at the reservoir temperature. The viscosity is measured using a Brookfield viscometre (nodule UL at 6 rpm) at different ageing times (0 and 90 days) Wider nitrogen blanket at the field temperature.

Experimental Protocol for Powder Caking Test

Commercially available polyacrylamide powders must be free flowing for ease of handling (air transport, transfer via metering screws). Aggregates formation or caking is detrimental to handling. These aggregates can be famed during storage of the powders by a compaction effect. It is therefore important to determine the caking effect of the invention in the case of powders, The test consists in compacting the powder under a load equivalent to 1.5 tonne/m$^2$ in an oven at 60° C. regulated at 60% relative humidity for 30 days. The test is positive if the powder flow remains fluid and no aggregate is formed.

Examples 1 to 7

The experimental protocol for use is the one described previously. The polymers tested are FP3630S (30 mol % anionic charges, molecular weight 16.10$^6$ g/mol) and FP AN125 (25 mol % anionic charge, molecular weight 6.10$^6$ g/mol). The quantity of dissolved oxygen is 50 ppb. The results are given in Table 1.

Oxygen reducing agent=Ag1
Precipitating agent=Ag2
Free radical scavenger=Ag2
Sacrificial agents=Ag4
Complexing agents=Ag5
Addition method:
    Water: additives added in diluted form at injection
    Invention: addition of additives according to the invention.

TABLE 1

| | Examples 1 to 7 | | | | | | |
|---|---|---|---|---|---|---|---|
| Exp | 1 | 2 | 3 | 4 | 5 | 6 | 7 |
| TDS (g/l) | 10 | 10 | 10 | 30 | 30 | 30 | 5 |
| Ca + Mg (g/l) | 0.5 | 0.5 | 0.5 | 1.0 | 1.0 | 1.0 | 1.0 |
| Iron (ppm) | No | No | No | 2 | 2 | 2 | 2 |
| Temp. (° C.) | 60 | 60 | 60 | 85 | 85 | 85 | 85 |
| Polymer | FP3630 | FP3630 | FP3630 | FP AN125 | FP AN125 | FP AN125 | FP AN125 |
| Total formlation dosage (ppm) | 1000 | 1255 | 1305 | 2000 | 2000 | 2510 | 2540 |
| Polymer dosage (ppm) | 1000 | 1000 | 1000 | 2000 | 2000 | 2000 | 2000 |
| Addition method | Water | Invention | Invention | Water | Water | Invention | Invention |
| Ag1 | MBS | MBS | MBS | MBS | MBS | MBS | MBS |
| Dose 1 (%/powder) | 1 | 1 | 1 | 0.5 | 0.5 | 0.5 | 0.5 |

TABLE 1-continued

Examples 1 to 7

| Exp | 1 | 2 | 3 | 4 | 5 | 6 | 7 |
|---|---|---|---|---|---|---|---|
| Ag2 | No | No | No | No | Phosphate | No | Phosphate |
| Dosage 2 (%/powder) | No | No | No | No | 1.5% | No | 1.5% |
| Ag3 | Thiourea | DMTU | DMTU | DETU | DETU | DETU | DETU |
| Dosage 3 (%/powder) | 40 | 9.5 | 9.5 | 10 | 10 | 10 | 10 |
| Ag4 | IPA | PETA | PETA | PETA | PETA | PETA | PETA |
| Dosage 4 (%/powder) | 20 | 15 | 15 | 15 | 15 | 15 | 15 |
| Ag5 | No | No | Dispersant AA/ATBS | No | No | No | No |
| Dosage 5 (%/powder) | No | No | 5 | No | No | No | No |
| Visc (cps) t = 0 | 28 | 28 | 28 | 12 | 12 | 12 | 12 |
| Visc (cps) t = 90d | 26 | 35 | 40 | 7 | 9 | 12 | 16 |

TDS: Total dissolved salts
DETU: Diethylthiourea
DMTU: Dimethylthiourea
MBS: Sodium Metabisulphite
PETA: Pentaerythritol
IPA: Isopropanol A comparison of experiment 1 with experiment 2 shows that:

the invention provides better protection of the polymer (+35%)

the additive content can be reduced from 61% to 25.5%.

Since thiourea and isopropanol must be prediluted ITW (mixture comprising 15% of thiourea and 7.5% of IPA) and MBS must be prediluted in a 40% solution, experiment 1 requires injecting 25 ppm of MBS at 40%, 2667 ppm of ITW and 1000 ppm of polymer through several storage units, pumps, dissolution tank. In the case of the invention as described in experiment 2, only 1255 ppm of the formulation is injected. The invention therefore provides an advantageous solution to this logistic, storage, preparation and injection aspect.

IPA is flammable and has a flashpoint of 12° C.; thiourea is harmful to humans (Xn and CMR class 3) and the environment, whereas PETA is a solid alcohol and DMTU is an alkyl thiourea that is only irritating, so that the invention provides an advantageous solution to this aspect also.

A comparison of experiment 2 with experiment 3 shows that:

The incorporation of a divalent ion chelating agent serves to benefit from the increase in viscosity (+14.3%) associated with a rise in the hydrolysis of FP 3630 at 60° C. for 3 months, an increase mitigated in experiments 1 and 2 by the presence of the divalent cations.

A comparison of experiment 4 with experiment 5 and experiment 6 with experiment 7 shows that:

The incorporation of a precipitant for ferrous ions causes better stabilization of the solutions (+28.6%).

The comparison of experiment 4 with experiment 6 and of experiment 5 with experiment 7 shows that:

The incorporation of the additives in the powder allows a better stability of the polymers in solution (+71% and 78%), Example 8

Injection of a Polyacrylamide Emulsion

The brine to be viscosified contains 6 ppm iron II, a total dissolved salts content (IDS) of 20000 ppm and an oxygen content of 50 ppb. The reservoir temperature is 30° C. The target product for viscosifying this water is a sodium poly (acrylamide-co-acrylate) with a molecular weight of $16.10^6$ g/mol containing 25 mol % of anionic charges. This polymer is obtained in the form of a reverse emulsion (FLOPAAM EM533™) containing 30% of polymer, 40% of water and 30% of mineral oil which is called EMI. Due to the composition of the water to viscosity, the choice of additives falls on an oxygen scavenging agent (sodium metabisulphite MES), a free radical scavenger (mercaptobenzothiazole—MET) and an iron precipitating agent (sodium phosphate). Part of the EMI, emulsion is withdrawn and the various additives added: OA 5% of MET, 0.05% of MBS and 0.25% of phosphate: emulsion. EM2. The level of stabilizer is equal to 1.5% related to polymer. The stability tests show that this mixture is stable in the normal storage and handling conditions.

The two emulsions are placed in solution in the predefined brine in the absence of iron using a magnetic stirrer. They are then diluted with a solution degassed under nitrogen containing iron II in the form of Mohr's salt to obtain a final concentration of 6 ppm iron II and 3000 ppm polymer. The solutions are then degassed with nitrogen so that the residual quantity of oxygen in solution is 50 ppb. The various additives, phosphate, MBT, MBS are added to the solution containing the emulsion EMI so that the quantity of each additive added corresponds to the quantity present in the solution containing EM2. 6 ppm of iron H in the form of Mohr's salt is then added under nitrogen blanket. The solutions are then distributed in various glass ampoules which are sealed under nitrogen atmosphere. Each ampoule is placed in an oven at 30° C. simulating the reservoir temperature. The viscosity is measured with a Brookfield viscometre (module UL at 6 rpm) at different ageing times (0, 7, 15 and 30 days) under nitrogen stream.

Figure 1:
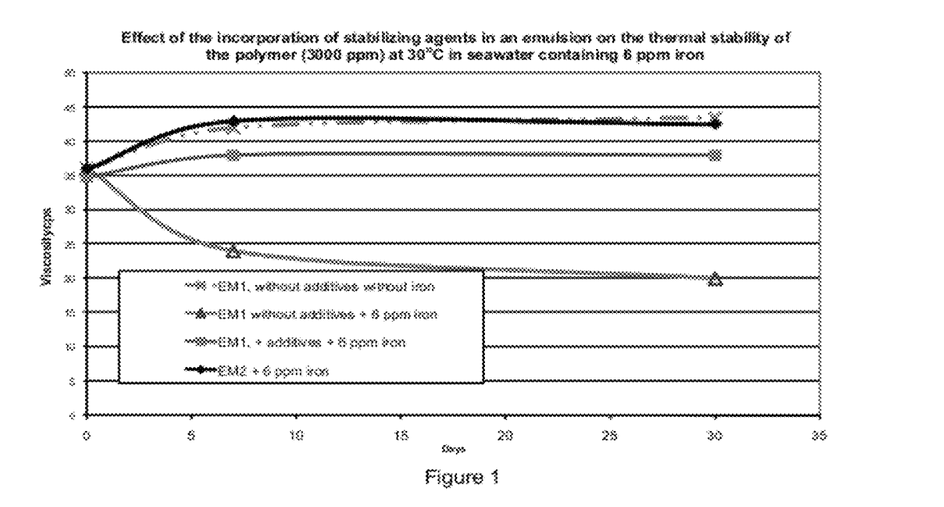
FIG. 1 shows the effect of the incorporation of the stabilizing agents in an emulsion on the thermal stability of the polymer.

The results are given in FIG. 1.

The addition of iron causes a decrease in viscosity of emulsion EMI which does not contain stabilizing agents. The addition of the stabilizing agents to the solution before the addition of iron does not improve the stability of emulsion EMI. However, the emulsion. EM2 containing stabilizing additives does not display a drop in viscosity when iron is added, and is stable for 30 days in the same conditions.

The viscosity of EM2 after 30 days is 10% higher than that of EMI with the same additives.

Example 9

Injection of a Polymer in Powder Form

The brine to be thickened contains 1 ppm iron II, a total dissolved salts content (TDS) of 3000 ppm and an oxygen content of 50 ppb. The reservoir temperature is 85° C. The target product for viscosifying this water is a sodium poly-acrylamide-co-(2-acrylamido-2-methylpropane sulphonate)-co-(sodium acrylate)) FLOPAAM 5115™ with a molecular weight of $12.10^6$ g/mol containing 25 mol % of anionic charge. This polymer is obtained in powder form by a direct drying method. The choice of the additive falls on an oxygen reducing agent (MBS), two free radical scavenger (MBT and diethyl thiourea) and optionally a sacrificial agent, pentaerythritol.

As for the previous example, 3 samples are prepared with the different additives:
PWD1: no additives
PWD2 contains 0.5% MBT, 5% diethyl thiourea, 1% of MBS (0.5% of additives)
PWD3 contains 0.5% MBT, 5% diethyl thiourea, 1% of MBS, 15% pentaerythritol (21.5% of additives).

The caking tests at 60° C. show that these powder mixtures are stable in the practical conditions of use.
Experimental Protocol The powders are dissolved in the brine to obtain a stock solution containing 5000 ppm of polymer. The stock solution is then diluted with a solution using a nitrogen blanket and containing iron II in the form of Mohr's salt to obtain a final concentration of 1 ppm iron II and 1000 ppm polymer. The solutions are then degassed with nitrogen so that the residual quantity of oxygen in solution is 50 ppb The various additives of PWD3 are added under nitrogen blanket to the solution of PWD1 so that the quantity of each additive corresponds to those of the solution of PWD3.

The solutions are then distributed in the various glass ampoules which are sealed under nitrogen blanket. Each ampoule is placed in an oven at 85° C. simulating the reservoir temperature. The viscosity is measured with a Brookfield viscometre (module UL at 6 rpm) at different ageing times (0, 7, 15 and 30 days) under nitrogen blanket.

Figure 2:
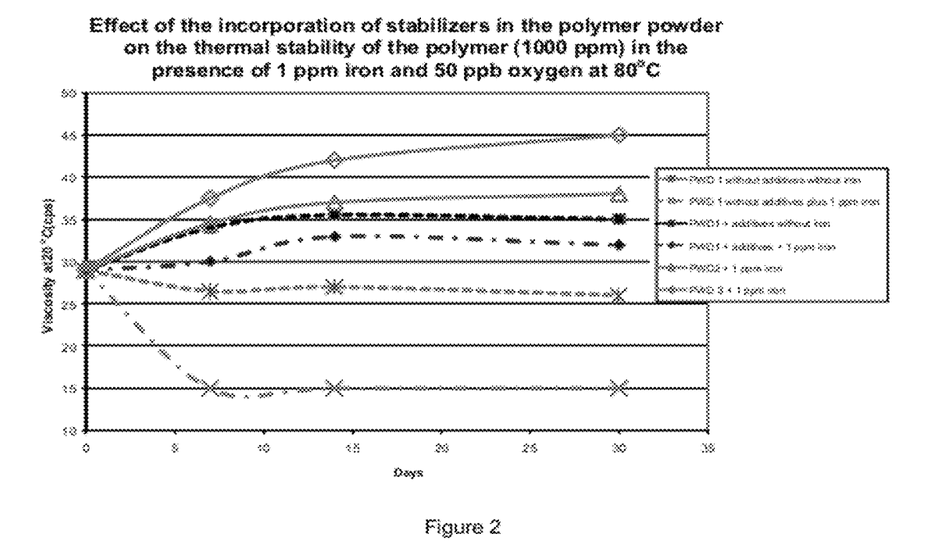
FIG. 2 shows the effect of the incorporation of the stabilizers in the polymer powder on the thermal stability of the polymer.

The results are given in FIG. 2.

It is observed that by adding the additives to the powder PDW1, a gain in viscosity is obtained. This viscosity increase is associated with the hydrolysis of the acrylamide group to acrylate group, increasing the anionic charge density of the polymer chain group.

This increase in viscosity is not observed in the absence of the stabilizing additives. This is explained by the free radical degradation of the polymers which offsets the increase in viscosity associated with hydrolysis, by decreasing the molecular weight. In the presence of iron, this degradation is highly pronounced.

The addition of the additives to the powder formulations serves to increase the viscosity over time compared to the unincorporated product. The incorporation of the stabilizing agents to the powder is therefore beneficial compared to a delayed addition of these agents. In this example, it may also be observed that the product comprising 4 additives (PWD3) is far more efficient in terms of stability than the one comprising only 3 additives (PWD2).

PWD3 has a viscosity after 30 days that is 200% higher than PW1D without additive and 40% higher than PWD1 with the additives added separately.

Other tests were performed in various cases and led to the same conclusions. These examples are described below.

Example 10

Injection of a Polymer in Powder Form

The brine to be viscosified contains a total dissolved salts content (TDS) of 30000 ppm with 800 ppm calcium and an oxygen content of 50 ppb. The reservoir temperature is 70° C. The target product for viscosifying this water is a sodium poly(acrylamide-co-acrylate) called FLOPAAM 6030S™ having a molecular weight of $22.10^6$ g/mol containing 30 mol % of anionic charge. This polymer is obtained in powder form by a post-hydrolysis method. The choice of the additive falls on an oxygen reducing agent (MBS), two free radical capture agents (MBT and diethyl thiourea) and optionally a complexing agent of divalent ion, a sodium polyaspartate.

As for the preceding example, 3 samples are prepared with the different additives:
PWD4: no additives
PWD5: contains 0.5% of MBT, 5% of diethyl thiourea, 1% of MBS.
PWD6: contains 0.5% of MBT, 5% of diethyl thiourea, 1% of MBS, 15% sodium polyaspartate.

The caking tests at 60° C. show that these powder mixtures are stable in practical conditions of use.

The experiment protocol is the one described in example 9 with a dilution to 1500 ppm and an ageing temperature of 70° C. The results are given in Table 2.

Example 11

Injection of a Polymer in Powder Form

The brine to be viscosified contains a total dissolved salts content (TDS) of 80000 ppm with 5000 ppm calcium and an oxygen content of 20 ppb. The reservoir temperature is 110° C., The target product for viscosifying this water is a sodium poly(acrylamide-co-(N-vinylpyrrolidone)-co-(2-acrylamido-2-methylpropane sulphonate) with a molecular weight of $4.10^6$ g/mol containing 25 mol % of anionic charge. This polymer is obtained in powder form by a direct drying method. The choice of the additive falls on an oxygen reducing agent (MBS), a free radical scavenger (MBT) and a sacrificial agent (polyvinyl acetate hydrolyzed to 80 mol % of polyvinyle alcohol=PVA) and optionally a complexing agent for divalent ions, a dispersant FLOSPERSE TS10030 (maleic acid-acrylic acid copolymer with a molecular weight of 15000 g/mol).

As for the preceding example, 3 samples are prepared with the different additives:
PWD7: no additives
PWD8 contains 0.5% of MET, 10% of PVA, 1% of MBS.
PWD9 contains 0.5% of MET, 10% of PVA, 1% of MBS, 15% of Flosperse TS1030.

The caking tests at 60° C. show that these powder mixtures are stable in practical conditions of use.

The experimental protocol is the one described in example 9 with a dilution to 3000 ppm of polymer, an oxygen content of 20 ppb and an ageing temperature of 110° C. The viscosities are measured at 80° C. The results are given in Table 2.

Example 12

Injection of a Polymer in Powder Form

The brine to be viscosified contains a total dissolved salts content (TDS) of 40000 ppm with 200 ppm calcium and an oxygen content of 200 ppb. The reservoir temperature is at 50° C. The target product for viscosifying this water is a sodium polyacrylamide-co-acrylate) FLOPAAM 3630™ with a molecular weight of $17.10^6$ g/mol containing 30 mol % of anionic charge. This polymer is obtained in powder form by direct drying method. The choice of the additives falls on an oxygen reducing agent (sodium erythorbate ES), two free radical scavengers (MBT and diethylthiourea).

As for the preceding example, 3 samples are prepared with the different additives:
PWD10: no additives
PWD11 contains 1% of MET, 10% of diethylthiourea, 1% of ES.
PWD12 contains 1% de MBT, 10% of diethylthiourea, 2% of ES.

The caking tests at 60° C. show that these powder mixtures are stable in practical conditions of use.

The experimental protocol is the one described in example 9 with a dilution to 1200 ppm of polymer, an oxygen content of 200 ppb and an ageing temperature of 50° C. The results are given in table 2.

Example 13

Injection of a Polymer in Powder Form in an ASP (Alkali Surfactant Polymer) System The brine to be viscosified contains a total dissolved salts content (TDS) of 3000 ppm with 2 ppm iron II and an oxygen content of 50 ppb. The reservoir temperature is 90° C. The target product for viscosifying this water is a sodium poly(acrylamide-co-(2-acrylamido-2-methylpropane sulphonate) FLOPAAM AN125™ with molecular weight of $6.10^6$ g/mol containing 25 mol % of anionic charge. This polymer is obtained in powder form by direct drying method. The choice of the additives falls on an oxygen scavenging agent (sodium dithionite NaDT), two free radical scavengers (sodium thiocyanate and diethylthiourea). The surfactant formulation added is a mixture of sulphonated anionic surfactant, non-ionic surfactant of the ethylene polyoxide type and an alcohol (sec-butanol), 0.5% of this surfactant formulation is added to the brine. The alkaline agent used is sodium carbonate (0.75% with regard to the solution).

As for the preceding example, two samples are prepared with the different additives:
PWD13; no additives
PWD14: contains 0.5% of sodium thiocyanate, 10% of diethylthiourea, 1% of NaDT.

The presence of alcohol and carbonate in the ASP composition eliminates the need for Ag4 and Ag2.

The caking tests at 60° C. show that this powder mixture is stable in practical conditions of use.

TABLE 2

Results of examples 10 to 12

| Exp | TDS (g/l) | Ca + Mg (g/l) | Imn (ppm) | Temp. (° C.) | Polymer | Polymer dose (ppm) | Addition method | Ag1 | Dose 1 (%/powder) | Ag2 | Dose 2 (%/powder) |
|---|---|---|---|---|---|---|---|---|---|---|---|
| 10 | 30 | 0.8 | no | 70 | PWD 4 | 1500 | Water | MBS | 1 | no | no |
| 10 | 30 | 0.8 | no | 70 | PWD 5 | 1500 | Invention | MBS | 1 | no | no |
| 10 | 30 | 0.8 | no | 70 | PWD 6 | 1500 | Invention | MBS | 1 | no | no |
| 11 | 80 | 1.0 | no | 110 | PWD 7 | 3000 | Water | MBS | 1 | no | no |
| 11 | 80 | 1.0 | no | 110 | PWD 8 | 3000 | Invention | MBS | 1 | no | no |
| 11 | 80 | 1.0 | no | 110 | PWD 9 | 3000 | Invention | MBS | 1 | no | no |
| 12 | 40 | 0.2 | no | 50 | PWD 10 | 1200 | Water | ES | 2 | no | no |
| 12 | 40 | 0.2 | no | 50 | PWD 11 | 1200 | Invention | ES | 1 | no | no |
| 12 | 40 | 0.2 | no | 50 | PWD 12 | 1200 | Invention | ES | 2 | no | no |

| Exp | Ag3 | Dose 3 (%/powder) | Ag4 | Dose 4 (%/powder) | Ag5 | Dose 5 (%/powder) | Visc (cps) t = 0 | Visc (cps) t = 90j |
|---|---|---|---|---|---|---|---|---|
| 10 | MBT DETU | 0.5 5 | no | no | aspartate | 15 | 13 | 11 |
| 10 | MBT DETU | 0.5 5 | no | no | no | no | 12 | 13 |
| 10 | MBT DETU | 0.5 5 | no | no | aspartate | 15 | 13 | 15 |
| 11 | MBT | 0.5 | PVA | 10 | TS10030 | 15 | 5.0 | 3.5 |
| 11 | MBT | 0.5 | PVA | 10 | no | No | 4.5 | 4.5 |
| 11 | MBT | 0.5 | PVA | 10 | TS10030 | 15 | 5.0 | 5.5 |
| 12 | MBT DETU | 1 10 | no | no | no | no | 6.5 | 6.0 |
| 12 | MBT DETU | 1 10 | no | no | no | no | 6.5 | 6.5 |
| 12 | MBT DETU | 1 10 | no | no | no | no | 6.5 | 7 |

The experimental protocol is the one described in example 9 with a dilution to 1500 ppm polymer, an oxygen content of 50 ppb and an ageing temperature of 90° C., The results are given in table 3.

and the temperature, causes a certain level of chemical degradation which the additives completely or partly prevent.

TABLE 3

| Exp | Iron (ppm) | Temp. (° C.) | Polymer | Polymer dose (ppm) | Addition method | NaDT dose (%/powder) | Sodium thiocyanate dose (%/powder) | DETU dose (%/powder) | % of surfactant solution in brine | % sodium carbonate in brine | Viscosity (cps) t = 0 | Viscosity (cps) t = 90d |
|---|---|---|---|---|---|---|---|---|---|---|---|---|
| 13-1 | no | 90 | PWD13 | 1500 | Water | 1 | 15 | 10 | 0 | 0 | 19 | 18 |
| 13-2 | 2 | 90 | PWD13 | 1500 | Water | 1 | 15 | 10 | 0 | 0 | 19 | 5 |
| 13-3 | 2 | 90 | PWD13 | 1500 | Water | 1 | 15 | 10 | 0 | 0.75 | 11 | 10 |
| 13-4 | 2 | 90 | PWD13 | 1500 | Water | 1 | 15 | 10 | 0.5 | 0.75 | 11 | 12 |
| 13-5 | no | 90 | PWD14 | 1500 | Invention | 1 | 15 | 10 | 0 | 0 | 19 | 21 |
| 13-6 | 2 | 90 | PWD14 | 1500 | Invention | 1 | 15 | 10 | 0 | 0.75 | 11 | 14 |
| 13-7 | 2 | 90 | PWD14 | 1500 | Invention | 1 | 15 | 10 | 0.5 | 0 | 19 | 23 |
| 13-8 | 2 | 90 | PWD14 | 1500 | Invention | 1 | 15 | 10 | 0.5 | 0.75 | 11 | 18 |

In this example,

The addition of sodium carbonate causes a drop in the initial viscosity (from 19 cps to 11 cps) due to the increase in total salinity of the brine (comparison of experiments 13-2 and 13-3), The gain in viscosity in the presence of sodium carbonate over time (experiments 13-3, 13-4, 13-6, 13-8) is due to the increased hydrolysis of the product by an increased pH.

The precipitating effect of iron by carbonate playing the role of Ag2 helps to improve the stabilization of the polymer solutions. In the absence of carbonate, a drop in viscosity is observed (comparison of experiments 13-1 with 13-3 and 13-5 with 13-6).

The addition of the surfactant formulation provides better stabilization of the solution (comparison of experiments 13-5 with 13-7). This stabilization is related to the presence of the alcohol co-solvent in the surfactant formulation playing the role of Ag4.

It is therefore advantageous to inject the polymer in the presence of carbonate and surfactant solution in order to obtain greater stabilization of the viscosity.

Example 14

Injection of a Polymer in Powder Form

In this example, 3 polyacrylamides containing 30 anionic mol % with the same molecular weight (around 15 million Daltons, UL 5.8 cps) obtained by different manufacturing methods (powder gel method, reverse emulsion, aqueous dispersion) are formulated with various additive systems of the present invention. One of the polyacrylamides in powder form is kept for a portion without additive.

The compositions thus obtained are placed in solution at 1000 ppm active of polymer in a water containing 3000 mg/l of NaCl. The water contains 1 ppm iron.

The 4 solutions thus prepared are conditioned in a controlled anaerobic system to 200 ppb dissolved oxygen and transferred to a glass ampoule sealed subsequently to fix the conditioning conditions.

The sealed ampoules are then placed in an oven at 85° C. to simulate the conditions encountered during the propagation of the polymer solution in the reservoir.

The ampoules are kept for 28 days in these conditions. The presence of O2, residues included in the polymer, iron In these conditions, the initial viscosity of the polymer solution is 46 cps at 25° C. as measured by a Brookfield viscosimetre with module UL speed 6 rpm.

The viscosity of the polymer after 28 days without additives is 17 cps at 25° C.

Figure 3:
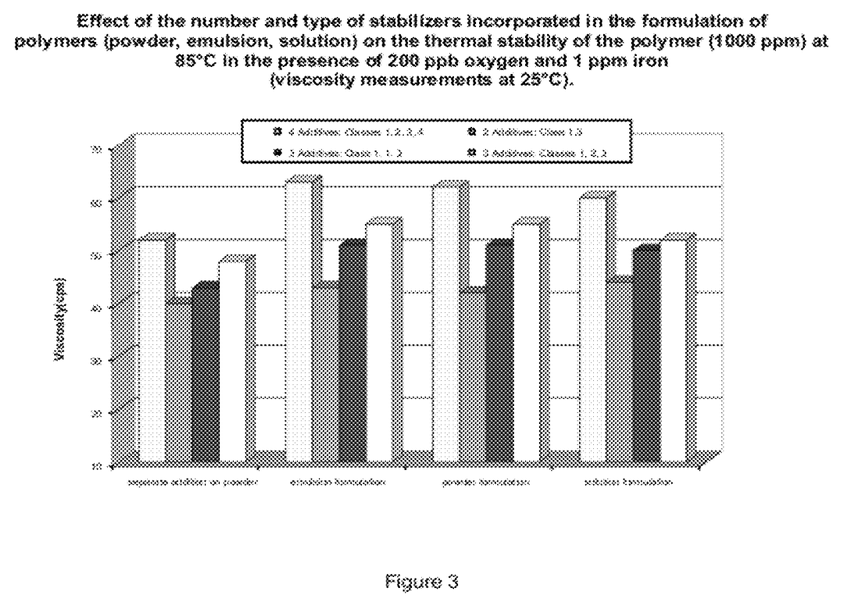
FIG. 3 shows the influence of the number and type of stabilizers incorporated in the polymer formulation (powder, emulsion, solution) on the thermal stability of the polymer.

The results are given in FIG. 3.

The invention claimed is:

1. A composition based on anionic polymers or water-soluble amphoteric (co)polymers, wherein the composition is suitable for viscosifying injection fluids for enhanced oil recovery and contains at least 30% by weight of a polymer, and at least three stabilizing agents selected from the group consisting of oxygen reducing agents, precipitating agents, free radical scavengers, complexing agents, and sacrificial agents, the stabilizing agents being suitable for preventing the chemical degradation of the polymer once the polymer is introduced into the injection fluid, wherein the polymer used contains:

a) at least one monomer selected from non-ionic monomers based on an acrylamide, acrylic, vinyl, allyl or maleic backbone and having a polar non-ionic side group, b) and optionally one or more ionic monomers selected from the group consisting of anionic monomers based on an acrylamide, acrylic, vinyl, allyl or maleic backbone and, having a carboxylic function, a sulphonic acid function; cationic monomers based on acrylamide, acrylic, vinyl, allyl or maleic having an amine or quaternary ammonium function, optionally combined with c) a hydrophobic monomer based on an acrylamide, acrylic, vinyl, allyl or maleic backbone, having a side hydrophobic function selected from the group consisting of derivatives of acrylamide, N,N-dialkylacrylamides, derivatives of acrylic acid, and vinyl monomers, d) and a branching/crosslinking agent selected from the group consisting of methylene bisacrylamide (MBA), ethylene glycol diacrylate, polyethylene glycol dimethacrylate, diacrylamide, cyanomethylacrylate, vinyloxyethylacrylate and methacrylate, triallylamine, formaldehyde, glyoxal, compounds of the glycidylether type and epoxides, e) and a surfactant monomer based on an acrylamide, acrylic, vinyl, allyl or maleic backbone and, having a structure bearing both hydrophilic and hydrophobic functions, and wherein:
the free radical scavengers are selected from the group consisting of diethyl thiourea, dimethyl thiourea, mercaptobenzothiazole and mercaptobenzoimidazole;
the oxygen reducing agents are selected from the group consisting of sulphites bisulphites, metabisulphites, dithionite, hydrazine and derivatives thereof, carbohydrazides, and sodium erythorbate;
the sacrificial agents are selected from the group consisting of glycerol, propylene glycol, trimethyleneglycol, isopropanol, 1,2-butanediol, 1,3-butanediol, 1,4-butanediol, 2,3-butanediol, 1,2,4-butanetriol, pentaerythritol (PETA), trimethylolethane, neopentylglycol, 1,2-pentanediol, 2,4-pentanediol, 2,3-pentanediol, trimethylolpropane, 1,5-pentanediol, and polyvinyl alcohol partially or totally hydrolyzed;
the complexing agents are selected from the group consisting of polyacetates, polycarboxylates, polyaspartates, polyphosphates, polyphosphonates, polysuccinates, ethylene-diamine-tetraacetic acid (EDTA), Hepta sodium salt of diethylene triamine penta (methylene phosphonic acid) (DTPMP.Na7), maleic acid, nitrilotriacetic acid (NTA), and oxalic acid; and
the precipitating agents are selected from the group comprising hydroxides, carboxylates, carbonates, arsenates, cyanurates, phosphorus derivatives and sulphur derivatives, and
wherein the composition is in the form of a powder, a bead, or a reverse emulsion.

2. A composition according to claim 1, wherein said composition contains two different stabilizing agents selected from the group consisting of free radical scavengers and a third stabilizing agent different from the first two and selected indifferently from the group consisting of free radical scavengers, complexing agents, sacrificial agents, oxygen scavenging agents and precipitating agents.

3. A composition according to claim 1, wherein said composition contains a first stabilizing agent selected from the group consisting of free radical scavengers, a second stabilizing agent selected from the group consisting of oxygen reducing agents, and a third stabilizing agent different from the first two and selected indifferently from the group consisting of free radical scavengers, complexing agents, sacrificial agents, oxygen reducing agents and precipitating agents.

4. A composition according to claim 1, wherein said composition contains at least 50% by weight of polymer.

5. A method for offshore or onshore enhanced oil recovery, consisting of injecting a fluid into the reservoir, the fluid being previously made viscous by means of a water-soluble polymer, characterized in that the polymer is in the form of the composition according to claim 1.

6. A method according to claim 5, wherein the composition is injected in a concentration lower than 10 g/l.

7. A composition according to claim 1, wherein the composition is in the form of a powder.

8. A composition according to claim 2, wherein said composition contains at least 50% by weight of polymer.

9. A composition according to claim 8, wherein the composition is in the form of a powder.

10. A composition according to claim 3, wherein said composition contains at least 50% by weight of polymer.

11. A composition according to claim 10, wherein the composition is in the form of a powder.

12. A method for offshore or onshore enhanced oil recovery, consisting of injecting a fluid into the reservoir, the fluid being previously made viscous by means of a water-soluble polymer, characterized in that the polymer is in the form of the composition according to claim 2.

13. A method according to claim 12, wherein the composition is injected in a concentration lower than 10 g/l.

14. A method for offshore or onshore enhanced oil recovery, consisting of injecting a fluid into the reservoir, the fluid being previously made viscous by means of a water-soluble polymer, characterized in that the polymer is in the form of the composition according to claim 3.

15. A method according to claim 14, wherein the composition is injected in a concentration lower than 10 g/l.

16. A composition according to claim 2, wherein the composition is in the form of a powder.

17. A composition according to claim 3, wherein the composition is in the form of a powder.

* * * * *